J. ROSENTHAL.
HOLDER FOR IRRADIATING APPARATUS.
APPLICATION FILED MAR. 9, 1908.
981,948.
Patented Jan. 17, 1911.
2 SHEETS—SHEET 1.
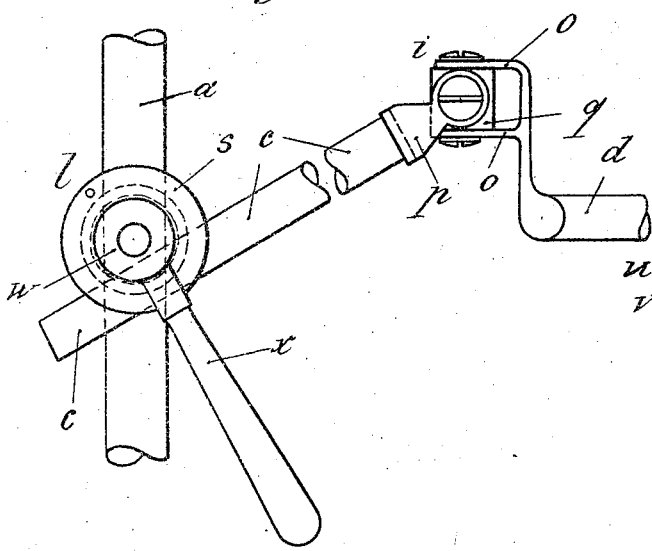
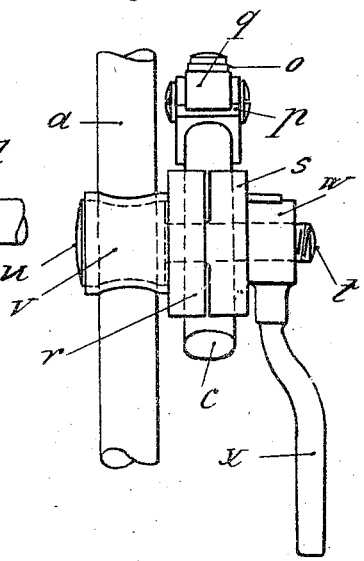
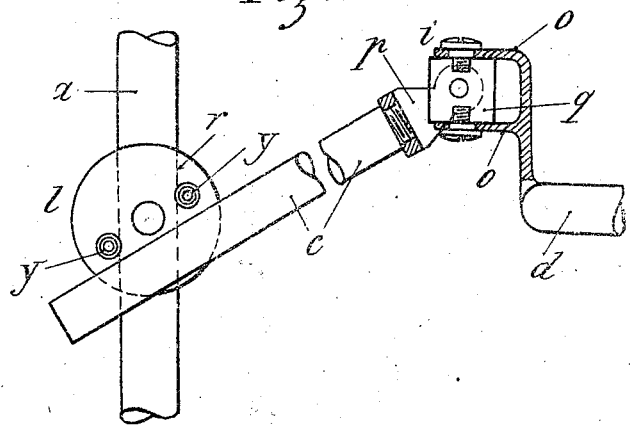
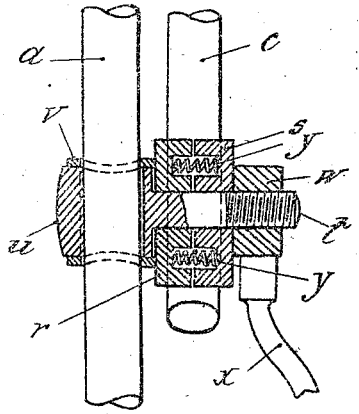
Witnesses:
E. O. Hildebrand
M. B. Taylor
Inventor:
Josef Rosenthal
by Georgii & Massie
his Attorneys J. ROSENTHAL.
HOLDER FOR IRRADIATING APPARATUS.
APPLICATION FILED MAR. 9, 1908.
981,948.
Patented Jan. 17, 1911.
2 SHEETS—SHEET 2.
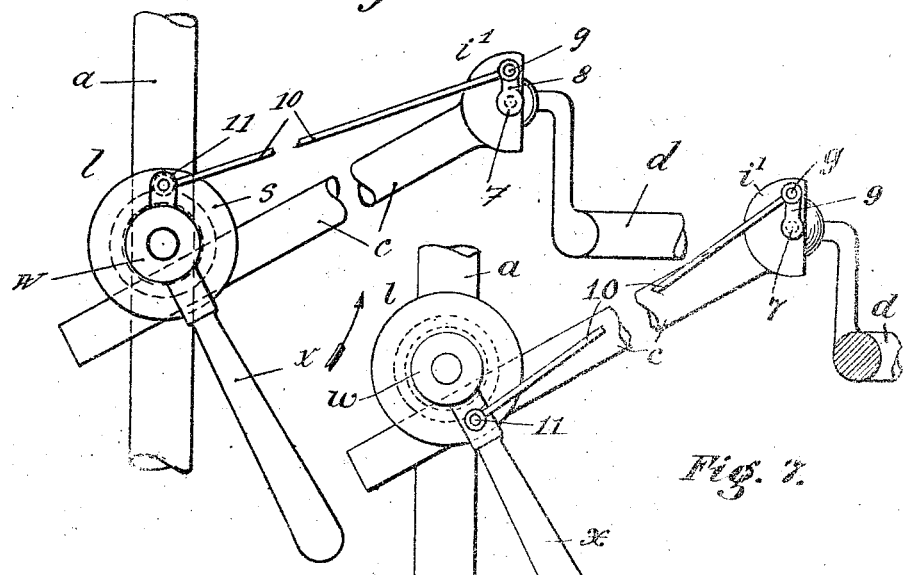
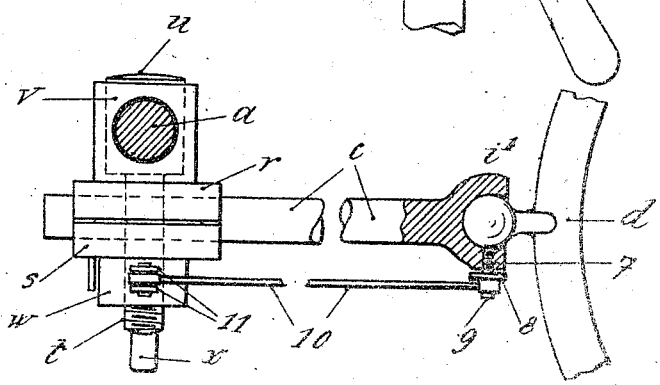
Witnesses:
Inventor:
Josef Rosenthal
by George & Massie
his Attorneys

UNITED STATES PATENT OFFICE.

JOSEF ROSENTHAL, OF MUNICH, GERMANY.

HOLDER FOR IRRADIATING APPARATUS.

981,948. Specification of Letters Patent. Patented Jan. 17, 1911.

Application filed March 9, 1908. Serial No. 419,975.

*To all whom it may concern:*

Be it known that I, JOSEF ROSENTHAL, engineer, citizen of Germany, residing at Munich, Bavaria, Germany, have invented certain new and useful Improvements in Holders for Irradiating Apparatus; and I do hereby declare the following to be a full, clear, and exact description of the invention, such as will enable others skilled in the art to which it appertains to make and use the same.

Devices for irradiating bodies by means of X or Roentgen rays, in which the compressive member, that is to say the part or frame designed to hold in place the object to be irradiated, is connected with the arms by ball and socket joints, the arms being in their turn mounted on sleeves slidingly arranged on pillars or supports, said arrangement allowing of the locking of the freely movable compressive member in any desired position, are not new. But with such devices at least four set-screws must be manipulated, this requiring considerable time.

The aim of the present invention is to simplify and quicken the work of locking in position a device of the kind mentioned above.

Reference being had to the accompanying drawings, which show in each case only one side or half of the entire device, the other side being the exact counterpart, one form of construction is shown in Figure 1 in a side view and in Fig. 2 in a view from the rear; Figs. 3 and 4 are the same views as Figs. 1 and 2 but contain certain parts in section. Figs. 5 and 6 illustrate a second form of construction, Fig. 5 being a side view and Fig. 6 a plan view with certain parts in section, and Fig. 7 a side elevation of still another modification.

The essential feature of this invention consists in the choice of suitable inner joints, thus making it possible to lock the entire device with the help of two hand screws only; hereby the time necessary to fix the compressive member in position is reduced to one half as compared with the devices in use formerly.

In the first form of construction, shown in Figs. 1 to 4, these inner joints ($i$) are in the form of cross-joints, that is, double joints with two axes at right angles to each other; each cross-joint consists of two stirrups or forks ($o$, $p$), the one ($o$) being attached to the compressive member having the form of a frame or ring ($d$), a portion only of which is represented and the other ($p$) to the arm ($c$). These forks ($o$, $p$) are pivoted to a center-piece ($q$). If now the two outer joints ($l$) of the device be locked, these inner cross-joints will also become automatically locked, making special set-screws at said inner joints unnecessary; for as soon as the arms ($c$) on each side of the compressive member or frame $d$ are fixed in position, the peculiar construction of the inner joints ($i$), makes a further displacement of the compressive member impossible.

In the following a suitable arrangement of the outer joints is described. The arm ($c$) slides between the two cheeks ($r$, $s$), the latter being suitably recessed to encompass said arm. These cheeks ($r$, $s$) are loosely arranged on the bolt ($t$), of which the head is formed as a sleeve ($u$), encompassing and slidingly arranged on the pillar or support ($a$). The other end of said bolt ($t$) contains a screw thread on which a nut ($w$) with handle ($x$) is arranged. The sleeve $u$ is encircled by an outer concentric sleeve $v$, adapted to slide on the same and also slidingly arranged on the pillar $a$. This sleeve $v$ is detached from but bears against the outer face of the cheek piece $r$, as shown.

The mode of procedure in using this device is as follows: The compressive member is first adjusted in the desired position by hand and the nuts ($w$) then tightened by means of their handles ($x$), thereby pressing the arms ($c$) between the cheeks ($r$, $s$). But at the same time the two sleeves or collars ($u$, $v$) are pressed in opposite directions against the support ($a$), thereby locking the entire joint together with the arm ($c$) to said support. In order to facilitate the unlocking of the cheeks, small coil springs ($y$) are inserted in suitable recesses in said cheeks, adapted to press them apart.

Figs. 5 and 6 illustrate a form of construction in which the outer joints are similar to the joint ($l$) described above, but the inner joints consist of ball and socket joints. In order in this case to also attain the same advantages as in the former construction, namely, the locking of the entire device with only two screws, the following arrangement has been made.

The inner ball and socket joint ($i^1$) is fitted with a set screw (7), having a head (8) in the form of the crank. A rod (10)

is at one end pivotally attached to the pin (9) of said crank, the other end being pivoted at (11) to the nut ($w$) of the outer joint ($l$). If the handle ($x$) be now moved in the direction of the arrow (Fig. 5), not only will the outer joint ($l$) be locked but rod (10) will also lock the inner ball and socket joint by means of the set screw (7). When the outer joint ($l$) is unlocked, the inner ball and socket joint will likewise be unlocked by the rod (10).

It will be obvious that the connecting rod (10) may also be pivoted to the handle ($x$) of the outer joint ($l$), as shown in Fig. 7, or any other suitable contrivance may be used for insuring conformity of action of the outer and inner joints.

It will be seen from the above that in all the forms shown in illustration of my invention, the supporting pillar $a$ and the connecting rod $c$ are slidingly arranged within a clamp composed of the cheek pieces $r$, $s$, on the one hand and the sleeves $u$, $v$ arranged to slide one within the other on the other hand, and that the said pillar and arm are adapted to be simultaneously locked or unlocked by means, which under the preferable form of my invention, as shown, consist of the screw stud $x$ passing through the cheeks and the nut, $w$, bearing against the inner cheek piece. By this means when the arm $c$ has slid to the proper extent through the clamp constituting the outer joint to permit it to take the proper inclination required by the position or height of the holding frame, and the clamp has slid to the proper height on the pillar $a$, the clamp is locked by one movement of the nut $w$ or the handle $x$.

As it is desirable to lock or unlock the universal joint at $i$ or $i'$ constituting the inner joint of the apparatus, the additional locking means shown in Figs. 5 to 7 has been devised, said locking means consisting of the connecting rod 10 connected as above described to the first clamp locking device on the one hand and the locking means for the universal joint, comprising the clamp screw 7 and the crank arm 8, on the other. Thereby both the clamp and the universal joint are simultaneously locked or unlocked, as the case may be.

The advantages of an apparatus thus constructed will be apparent when it is considered that, in exposing a part of the body to X-rays, the operator must press the compression member $d$ on the part to be treated in such a way that the soft portions are compressed thereby reducing the thickness of the part to be penetrated by said rays. In so manipulating the instrument the proper position for the compressing member is different for each individual case and can only be found by trial, and for this purpose the said compressing member must, within certain limits, be free to move in every direction. When the proper position of the compressing member has been thus obtained, it is necessary that the same can be quickly, and by a simple manipulation, secured against movement in any direction, so that the cross-section of the parts to be irradiated will remain unchanged during the entire irradiating process. This result is attained in an eminently satisfactory manner by this apparatus in which, as above set forth, the compressing member when once in position is locked against movement by a single turn or twist of the locking handle $x$.

What I claim as my invention and desire to secure by Letters Patent, is:

1. In a holder for irradiating apparatus, a supporting pillar, a holding frame, and a connecting arm between the supporting pillar and holding frame, in combination with a clamp engaging the pillar and the connecting arm, and means for simultaneously locking or unlocking the clamp on the pillar and the arm.

2. In a holder for irradiating apparatus, a holding frame, a supporting pillar, and a connecting arm between the supporting pillar and the holding frame, in combination with a clamp in which the pillar and the connecting arm are slidably mounted, and means for simultaneously locking or unlocking the clamp on the pillar and the arm.

3. In a holder for irradiating apparatus, a supporting pillar, a holding frame, and a connecting arm between the supporting pillar and holding frame, in combination with a clamp consisting of two parts for engaging the pillar and the connecting rod, respectively, said parts being rotatable with respect to each other, and means for simultaneously locking the parts of the clamp on the pillar and the arm and with respect to one another.

4. In a holder for irradiating apparatus, a holding frame, a supporting pillar, and a connecting arm between the pillar and the frame, in combination with a clamp consisting of a pair of cheeks between which the connecting arm is slidably arranged, a pair of sleeves arranged to slide within each other, a screw stud forming part of one sleeve and extending through the cheeks, and a nut engaging the screw stud and bearing on one of the cheeks, the other sleeve being free to slide on the first and bearing against the other cheek.

5. In a holder for irradiating apparatus, a supporting pillar, a holding frame, and an arm connected to the holding frame by a universal joint, in combination with a clamp in which the pillar and connecting arm are slidably mounted, and means for simultaneously locking or unlocking the clamp on the pillar and the arm, 6. In a holder for irradiating bodies, a holding frame, a supporting pillar, an arm connected to the holding frame by a universal joint, and means for locking the universal joint, in combination with a clamp in which the pillar and the connecting arm are slidably mounted, means for simultaneously locking or unlocking the clamp on the pillar and the arm, and a connecting rod between said means and the means for locking the universal joint, whereby the latter is locked or unlocked simultaneously with the clamp.

7. In a holder for irradiating apparatus, a holding frame, a supporting pillar, and an arm connected to the holding frame by one joint and to the pillar by another joint, in combination with means for simultaneously locking the joint of the holding frame and also the joint of the pillar.

In testimony whereof I hereunto affix my signature in the presence of two witnesses.

JOSEF ROSENTHAL.

Witnesses:
MATHILDE K. HELD,
LOUIS F. MUELLER.